(12) United States Patent
Baker (10) Patent No.: US 9,624,631 B2
(45) Date of Patent: Apr. 18, 2017

(54) TOUCHLESS DISPOSABLE PET FECES DEVICE

(71) Applicant: Cheryl Davidson Baker, Grand Junction, CO (US)

(72) Inventor: Cheryl Davidson Baker, Grand Junction, CO (US)

( * ) Notice: Subject to any disclaimer, the term of this patent is extended or adjusted under 35 U.S.C. 154(b) by 0 days.

(21) Appl. No.: 15/095,103

(22) Filed: Apr. 10, 2016

(65) Prior Publication Data

US 2016/0298305 A1 Oct. 13, 2016

Related U.S. Application Data

(60) Provisional application No. 62/145,872, filed on Apr. 10, 2015.

(51) Int. Cl.
*A01K 29/00* (2006.01)
*E01H 1/12* (2006.01)
*A01K 1/01* (2006.01)

(52) U.S. Cl.
CPC ............. *E01H 1/1206* (2013.01); *A01K 1/01* (2013.01); *E01H 2001/126* (2013.01)

(58) Field of Classification Search
CPC .... E01H 1/1206; E01H 2001/126; A01K 1/01
USPC ........................................................ 294/1.3
See application file for complete search history.

(56) References Cited

U.S. PATENT DOCUMENTS

| | | |
|---|---|---|
| 2,060,730 A | 11/1936 | Gillespie |
| 2,244,072 A | 6/1941 | Ledbetter |
| D157,357 S | 2/1950 | Fairchild |
| D158,343 S | 4/1950 | Watson |
| 2,782,554 A | 2/1957 | Muller |
| 3,138,211 A | 6/1964 | Blom |
| 3,358,698 A | 12/1967 | Blanchard |
| D210,860 S | 4/1968 | Scheliens |
| 3,653,392 A | 4/1972 | Hassey |
| 3,738,697 A | 6/1973 | Kahan |
| 3,841,684 A | 10/1974 | Fleishman |

(Continued)

FOREIGN PATENT DOCUMENTS

WO   WO 00/05458   *   2/2000

OTHER PUBLICATIONS

U.S. Appl. No. 29/523,534, filed Apr. 11, 2015, Notice of Allowance dated Feb. 3, 2016, Susan M. Lee, 16 pages.

*Primary Examiner* — Dean Kramer
(74) *Attorney, Agent, or Firm* — Stanley J. Gradisar Attorney At Law, LLC; Stanley J. Gradisar (57) ABSTRACT

A touchless disposable pet feces device is a clamshell-type device that provides a simple, civilized way to pick up animal feces—thus meeting a basic need for improved sanitation in populated areas. The touchless disposable pet feces device eliminates the unpleasant tactile feel of picking up pet feces by hand. With a pair of handles on one end and a plurality of curved tines on the other end with a hinge powered by a spring or rubber band in the middle, the user can squeeze the handles together to open up the curved tines, center the curved tines over pet feces, and release the pressure on the handles allowing the spring or rubber band to close the curved tines around the feces. Because the touchless disposable pet feces device is designed and made of low cost materials it can then be disposed of after a single use.

11 Claims, 10 Drawing Sheets

(56) References Cited

U.S. PATENT DOCUMENTS

| | | | | |
|---|---|---|---|---|
| 3,986,744 A | * | 10/1976 | Krogstad | E01H 1/1206 119/867 |
| 4,014,584 A | | 3/1977 | Bau | |
| 4,148,510 A | | 4/1979 | Brack | |
| 4,194,777 A | | 3/1980 | Carns | |
| 4,215,886 A | | 8/1980 | Naderi et al. | |
| 4,247,139 A | | 1/1981 | Grieb | |
| D259,968 S | | 7/1981 | Schneider | |
| 4,316,627 A | | 2/1982 | Solypa | |
| 4,368,907 A | | 1/1983 | Ross | |
| 4,378,670 A | | 4/1983 | Check | |
| 4,508,124 A | | 4/1985 | Franzino | |
| 4,624,272 A | | 11/1986 | Franzino | |
| D293,489 S | * | 12/1987 | Franzino | D28/25 |
| 4,718,707 A | | 1/1988 | Greenhut | |
| 4,854,624 A | | 8/1989 | Baymiller | |
| 4,911,185 A | | 3/1990 | Losenno | |
| D317,246 S | | 6/1991 | Driscoll | |
| D332,675 S | | 1/1993 | Simon | |
| 5,320,393 A | | 6/1994 | Cortinas | |
| 5,350,208 A | | 9/1994 | Heinrichson | |
| 5,359,840 A | | 11/1994 | Costar | |
| 5,385,376 A | * | 1/1995 | Malaspina | E01H 1/1206 15/257.6 |
| 5,409,279 A | | 4/1995 | Magee | |
| 5,503,442 A | | 4/1996 | Lee | |
| 5,520,201 A | | 5/1996 | Hart | |
| 5,564,763 A | * | 10/1996 | Mercurio | E01H 1/1206 294/1.3 |
| 5,601,321 A | | 2/1997 | Simon | |
| 5,628,537 A | | 5/1997 | Kiemer | |
| D380,864 S | | 7/1997 | Deakin | |
| D381,119 S | * | 7/1997 | Chang | D28/25 |
| D403,109 S | | 12/1998 | Potut | |
| D403,133 S | | 12/1998 | Bowell | |
| D410,302 S | | 5/1999 | Yasuda | |
| D414,583 S | | 9/1999 | Yasuda | |
| D415,591 S | | 10/1999 | Knudsen | |
| 6,035,863 A | | 3/2000 | Mao | |
| 6,059,332 A | * | 5/2000 | Beascoechea Inchaurraga | E01H 1/1206 294/1.3 |
| 6,098,255 A | | 8/2000 | Kumada | |
| 6,135,125 A | | 10/2000 | Sartena | |
| 6,186,151 B1 | | 2/2001 | Newlin | |
| D449,133 S | | 10/2001 | Potut | |
| 6,360,752 B1 | | 3/2002 | Chang | |
| D483,151 S | | 12/2003 | Walker | |
| D483,523 S | | 12/2003 | Jones | |
| 6,668,761 B2 | | 12/2003 | Tsigrik | |
| 6,681,778 B1 | | 1/2004 | Salisbury | |
| D488,258 S | | 4/2004 | Walker | |
| D501,276 S | * | 1/2005 | LaFauci | D28/40 |
| 6,986,325 B1 | * | 1/2006 | Hsu | E01H 1/1206 119/161 |
| D536,132 S | | 1/2007 | Vergona | |
| 7,216,905 B1 | * | 5/2007 | Armes, Jr. | E01H 1/1206 294/1.3 |
| 7,374,215 B2 | | 5/2008 | Anderson | |
| 7,429,212 B1 | | 9/2008 | Murray | |
| D583,991 S | | 12/2008 | Pichon | |
| D604,913 S | | 11/2009 | Boghozian | |
| D604,914 S | | 11/2009 | Boghozian | |
| D613,007 S | | 3/2010 | Anderson | |
| D627,099 S | | 11/2010 | Tu | |
| D627,516 S | | 11/2010 | Hsu | |
| 7,862,094 B1 | | 1/2011 | Lamont | |
| D637,348 S | | 5/2011 | Richmond | |
| D642,738 S | | 8/2011 | Hsu | |
| 7,992,907 B1 | | 8/2011 | Dejesus | |
| D663,494 S | | 7/2012 | Milliff | |
| 8,216,258 B2 | | 7/2012 | Skipper | |
| D669,217 S | | 10/2012 | Hsu | |
| 8,505,543 B2 | | 8/2013 | Miller | |
| D700,740 S | | 3/2014 | Cheung | |
| 8,833,817 B2 | | 9/2014 | Kovarik et al. | |
| D716,005 S | | 10/2014 | Mcnay | |
| 8,869,355 B2 | | 10/2014 | Huang | |
| D737,510 S | | 8/2015 | Wright | |
| 2003/0098035 A1 | | 5/2003 | Hildebrandt | |
| 2004/0154633 A1 | | 8/2004 | Rogers | |
| 2004/0231692 A1 | | 11/2004 | Shyu | |
| 2005/0087206 A1 | | 4/2005 | Shyu | |
| 2007/0028940 A1 | | 2/2007 | Coral | |
| 2007/0131238 A1 | * | 6/2007 | Chudzik | A45D 8/20 132/277 |
| 2008/0191502 A1 | | 8/2008 | Anderson | |
| 2008/0216861 A1 | | 9/2008 | Shyu | |
| 2008/0216862 A1 | | 9/2008 | Silva | |
| 2008/0257375 A1 | | 10/2008 | Tu | |
| 2009/0090379 A1 | | 4/2009 | Potut | |
| 2009/0096226 A1 | | 4/2009 | Anderson | |
| 2009/0255552 A1 | | 10/2009 | Hsu | |
| 2009/0261603 A1 | * | 10/2009 | Boghozian | E01H 1/1206 294/1.3 |
| 2009/0272397 A1 | | 11/2009 | Defenbaugh | |
| 2009/0272398 A1 | | 11/2009 | Chudzik | |
| 2009/0315349 A1 | | 12/2009 | Black | |
| 2010/0242987 A1 | | 9/2010 | Washington | |
| 2011/0193359 A1 | | 8/2011 | Howard | |
| 2012/0186602 A1 | | 7/2012 | Hsu | |
| 2014/0202489 A1 | | 7/2014 | Yang | |
| 2014/0209117 A1 | | 7/2014 | Wang | |
| 2015/0201728 A1 | | 7/2015 | Chudzik | |

* cited by examiner

TOUCHLESS DISPOSABLE PET FECES DEVICE

CROSS-REFERENCES TO RELATED APPLICATIONS

This application claims the benefit of U.S. Provisional Application Ser. No. 62/145,872 filed on Apr. 10, 2015 and titled "Touchless Disposable Pet Feces Device" which is incorporated herein by reference in its entirety for all that is taught and disclosed therein.

BACKGROUND

Technical Field

Disposal of pet feces, particularly dog feces, is a growing concern in communities across the country and around the world. This disclosure describes a unique and safe way to pick up and dispose of dog and other pet feces.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The detailed description below describes a touchless disposable pet feces device. The solution described below enables the use of a touchless disposable pet feces device.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or class of elements, such as X1-Xm, Y1-Yn, and Z1-Zo, the phrase is intended to refer to a single element selected from X, Y, and Z, a combination of elements selected from the same class (e.g., X1 and X2) as well as a combination of elements selected from two or more classes (e.g., Y1 and Z3).

It is to be noted that the term "a entity" or "an entity" refers to one or more of that entity. As such, the terms "a" (or "an"), "one or more," and "at least one" can be used interchangeably herein. It is also to be noted that the terms "comprising," "including," and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof, shall include all those described in the summary of the invention, brief description of the drawings, detailed description, abstract, and claims themselves.

The United States has an estimated dog population of over 83 million, and large U.S. cities have dog populations in the hundreds of thousands. New York City, for example, is estimated to have over 500,000 dogs. Similar situations exist in many countries around the world.

Like human feces, dog feces can cause sickness in humans when not disposed of properly. Dog feces contain parasites, bacteria, and viruses. When feces are left to decompose and are not picked up, they wash off into runoff water in cities and contaminate nearby bodies of water. According to the US Environmental Protections Agency, just 100 dogs can contribute enough bacteria, nitrogen, and phosphorus to close 20 miles of a bay-watershed to swimming and shell fishing.

Many dog owners do not pick up their pet's feces. While these reasons have been studied, the distasteful nature of this task likely contributes to owner's reluctance to pick up their pet's feces. What is needed in the art is a device that eliminates the distastefulness and improves the ease and frequency with which owners pick up their pet's waste. The touchless disposable pet feces device eliminates this barrier to cleanup of pet waste by eliminating the distasteful tactile sensation associated with picking up pet feces by hand.

To assist in the understanding of the present disclosure the following list of components and associated numbering found in the drawings is provided herein:

| Table of Components | |
| --- | --- |
| Component | # |
| female half | 2/2' |
| male half | 4/4' |
| curved tines | 6A/6B |
| hinge portion tabs | 8A/8B |
| | 8A'/8B' |
| spring | 10 |
| handle portions | 12A/12B |
| | 12A'/12B' |
| | 12A"/12B" |
| feces | 14 |
| stops | 16A/16B |
| | 16A'/16B' |
| short distance | 18 |
| side bars | 20A/20B |
| middle curved tines | 22A/22B |
| nibs | 24A/24B |
| hole | 26 |
| nub | 28 |
| voids | 30 |
| bag | 32 |
| levered spring | 34 |
| rod | 36 |
| first arm | 38 |
| second arm | 40 |
| rubber band | 42 |
| L-prongs | 44A/44B |
| bags | 46A/46B |
| device | 100 |
| | 100' |
| | 100" |
| | 100''' |

DETAILED DESCRIPTION

The touchless disposable pet feces device is a clamshell-type device which is made of a minimal amount of inexpensive materials to allow for disposal after a single use. Alternately, the device can be made of a stronger material with thicker dimensions to allow for large volume collection and cleaning for reuse by feces collection systems. Materials that may be utilized in the manufacture of the device include plastics, recycled plastics, corn-based and other sustainable or degradable materials, including pulp-based materials. The device may be manufactured utilizing a standard injection molding process. One or two small plastic bags may be attached to the clamshell-type device to increase the storage capacity of the touchless disposable pet feces device.

Referring now to the Figures, like reference numerals and names refer to structurally and/or functionally similar elements thereof, and if objects depicted in the figures that are covered by another object, as well as the tag line for the element number thereto, may be shown in dashed lines. FIGS. 1A-1I show various views of a touchless disposable pet feces device. Referring now to FIGS. 1A-1I, the touchless disposable pet feces device 100 consists of two halves, a female half 2 shown in FIGS. 1A-1C, and a male half 4 shown in FIGS. 1D-1F. The two halves 2/4 are fashioned roughly as clamshells facing each other, with a plurality of curved tines 6A/6B. The two halves 2/4 are connected together at a movable hinge portion tabs 8A/8B. A spring 10 holds the two halves 2/4 in the closed position as shown in FIG. 2A. The spring 10 is not shown in FIGS. 1A-1I for clarity in viewing the structure of the two halves 2/4.

Figure 1A:
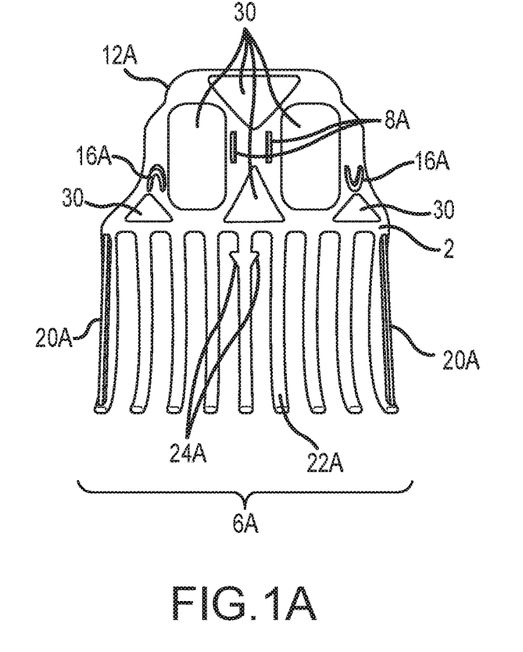
FIG. 1A shows a front view of the female half in an embodiment of the touchless disposable pet feces device of the present invention.
Figure 1B:
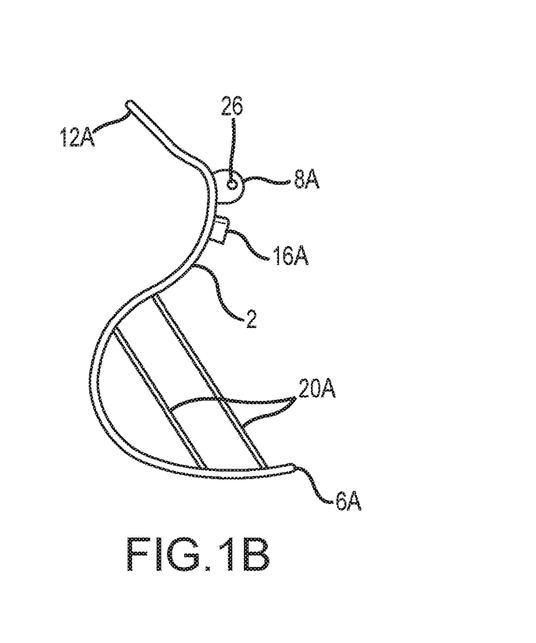
FIG. 1B shows a side view of the female half in an embodiment of the touchless disposable pet feces device of the present invention.
Figure 1C:
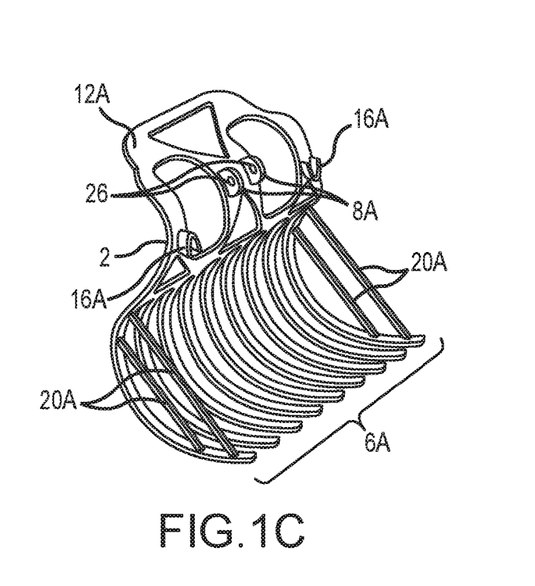
FIG. 1C shows a perspective view of the female half in an embodiment of the touchless disposable pet feces device of the present invention.
Figure 1D:
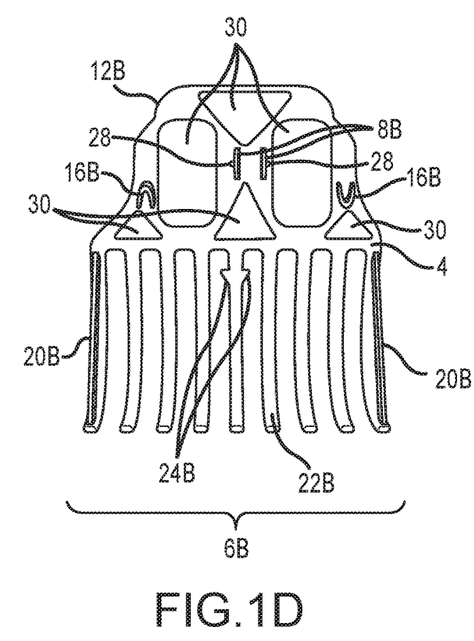
FIG. 1D shows a front view of the male half in an embodiment of the touchless disposable pet feces device of the present invention.
Figure 1E:
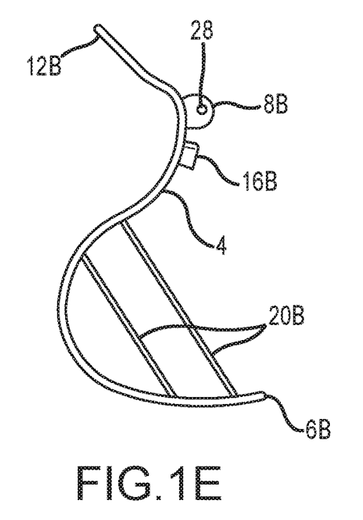
FIG. 1E shows a side view of the male half in an embodiment of the touchless disposable pet feces device of the present invention.
Figure 1F:
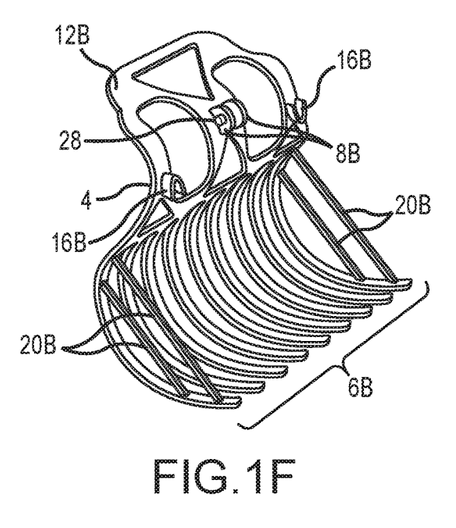
FIG. 1F shows a perspective view of the male half in an embodiment of the touchless disposable pet feces device of the present invention.
Figures 1G, 1H, 1I:
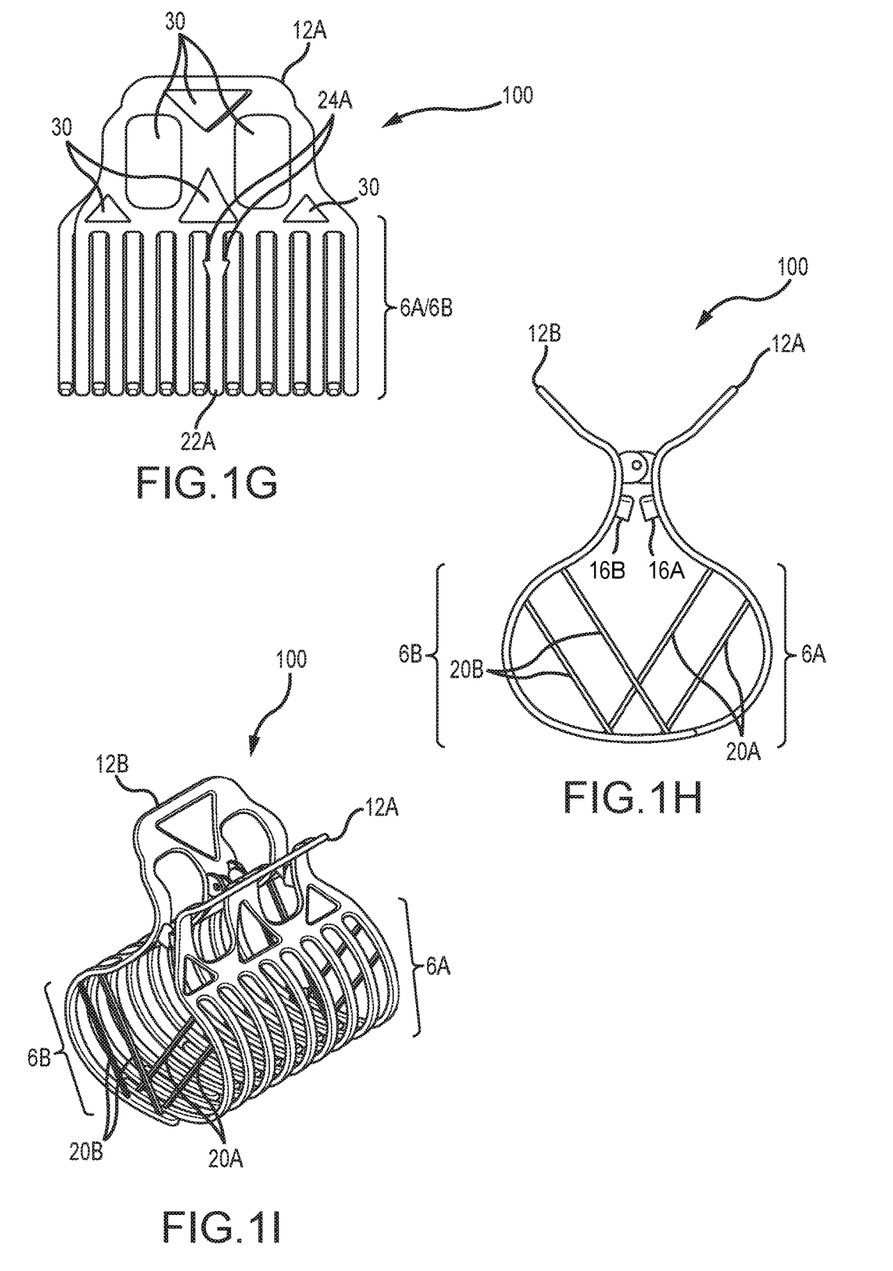
FIG. 1G shows a front view of an assembled female half and male half in an embodiment of the touchless disposable pet feces device of the present invention.
FIG. 1H shows a side view of an assembled female half and male half in an embodiment of the touchless disposable pet feces device of the present invention.
FIG. 1I shows a perspective view of an assembled female half and male half in an embodiment of the touchless disposable pet feces device of the present invention.
Figure 2A:
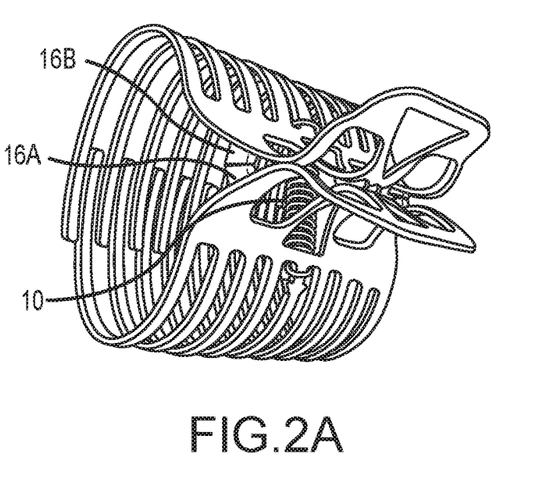
FIG. 2A shows a perspective view of an assembled female half and male half showing a spring and the male and female halves in the closed position in an embodiment of the touchless disposable pet feces device of the present invention.
Figure 2B:
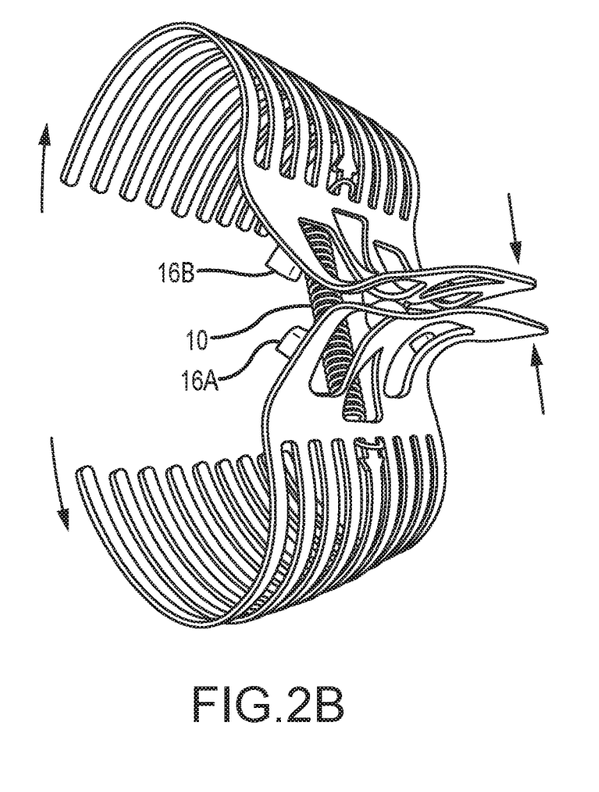
FIG. 2B shows a perspective view of an assembled female half and male half showing a spring and the male and female halves in the open position in an embodiment of the touchless disposable pet feces device of the present invention.
Figure 4A:
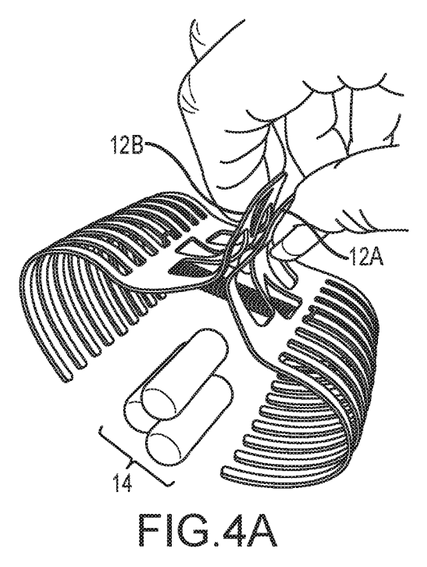
FIGS. 4A through 4D show a method of using the touchless disposable pet feces device of the present invention.
Figure 4B:
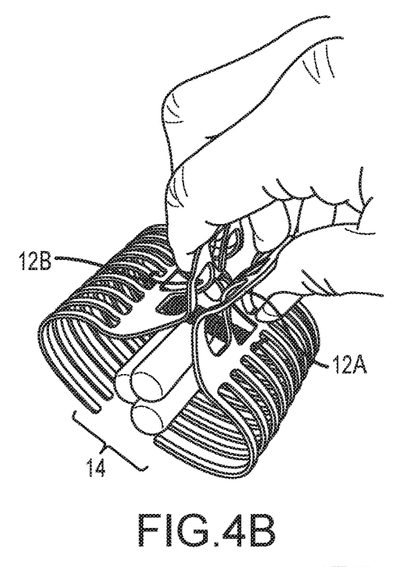
Figure 4C:
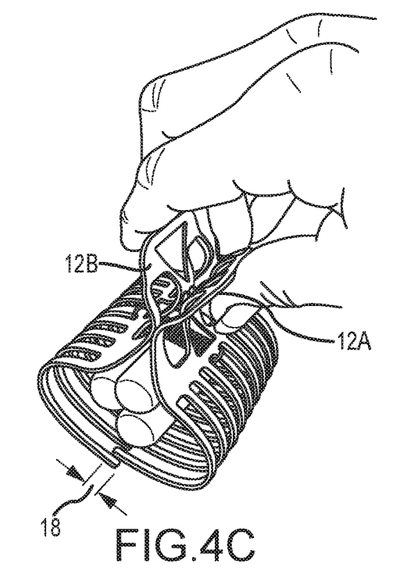
Figure 4D:
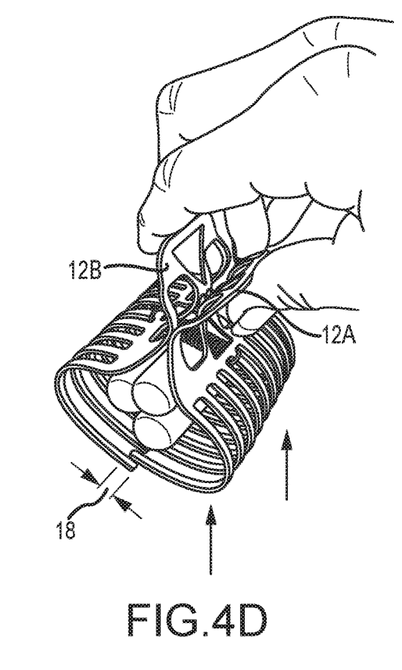

FIGS. 1G-1I show the two halves 2/4 assembled together. Each of the two halves 2/4 have a handle portion 12A/12B on the other side of the hinge portion tabs 8A/8B from the clamshells which are used to open and close the device 100. The user squeezes the two handles 12A/12B toward each other, which opens the clamshells on the opposite side of the hinge portion tabs 8A/8B as shown in FIG. 2B. The user opens the clamshells with the two handles 12A/12B and positions the separated curved tines 6A/6B over the pet feces 14 (as shown in FIG. 4A) and then lightens their grip on the two handles 12A/12B, allowing the spring 10 to close the curved tines 6A/6B around the pet feces 14 (as shown in FIGS. 4B-4D), capturing the feces 14 within the device 100. The curvature of the curved tines 6A/6B forming the clamshells of the device 100 allow for an adequately sized enclosed volume to retain the dog feces 14. In addition, the device 100 can be manufactured in different overall sizes (length, width, and height) to accommodate small dog feces, medium size dog feces, and large dog feces. The device can also be used to pick up feces for other animals besides dogs.

Each female half 2 and male half 4 have a pair of stops 16A/16B on their interior sides that come in contact and abut with each other in the closed position. These stops 16A/16B prevent the clamshells from closing completely and thus eliminating the desired enclosed volume. In another embodiment, each female half 2 and male half 4 have only one stop that come in contact with and abut each other. As best seen in FIGS. 1I, 2A, 4C, and 4D, in the closed position the tips of the curved tines 6A/6B overlap each other a short distance 18 ensuring that the feces 14 cannot fall out.

Further, the pair of side bars 20A/20B on each outer end of the curved tines 6A/6B of the two halves 2/4 provide a crisscross barrier to prevent the feces 14 from falling out of either end of the device 100 when the device 100 is in the closed position. In different embodiments, there may be fewer than two or more than two side bars on each outer end of the curved tines 6A/6B. The side bars 20A/20B are not shown in FIGS. 2A and 2B for clarity in observing opening and closing action and the spring 10. The device 100, with the feces 14 contained inside, is disposed into the nearest pet waste container, trash can, dumpster, etc.

On each male half 2 and female half 4, a middle curved tine 22A/22B has a pair of nibs 24A/24B located on either side of the middle curved tine 22A/22B. A first looped end of the spring 10 is placed between the nibs 24A and the handle portion 12A of the middle curved tine 22A, and a second looped end of the spring 10 is placed between the nibs 24B and the handle portion 12B of the middle curved tine 22B. These nibs 24A/24B keep the spring 10 in the proper position to effectuate opening and closing of the two halves 2/4. The design of the nibs 24A/24B on the two middle curved tines 22A/22B allow for ease of assembly while providing a secure attachment mechanism for the spring 10. The spring 10 used for closing the curved tines 6A/6B of the device 100 are designed with sufficient force to be able to move through grass and dirt and to lift and capture the feces 14 inside the enclosed volume of the device 100.

The design of the hinge portion tabs 8A/8B facilitates easy assembly. The female half 2 has a pair of hinge portion tabs 8A separated from each other by a short distance, with each hinge portion tab 8A having a hole 26 therein symmetrical to each other, a mirror image of each other. In one embodiment, a tapered slot leads from the front edge to the holes. The male half 4 has a pair of hinge portion tabs 8B separated from each other by a shorter distance than the hinge portion tabs 8A on the female half 2. Each of the hinge portion tabs 8B have a protruding nub 28 on their outward faces, a mirror image of each other, that mate and align with the two holes 26 on the hinge portion tabs 8A of the female half 2. The two halves 2/4 snap together when the hinge portion tabs 8B of the male half 4 are pushed in between the hinge portion tabs 8A of the female half 2. The two nubs 28 on the hinge portion tabs 8B of the male half 4 cause the hinge portion tabs 8A on the female half 2 to open up due to the elasticity of the material from which the two halves 2/4 are made. When the two nubs 28 align with the two holes 26, the hinge portion tabs 8A of the female half 2 and the hinge portion tabs 8B of the male half 4 snap back to their unstressed positions and lock the two halves 2/4 together.

Figure 3A:
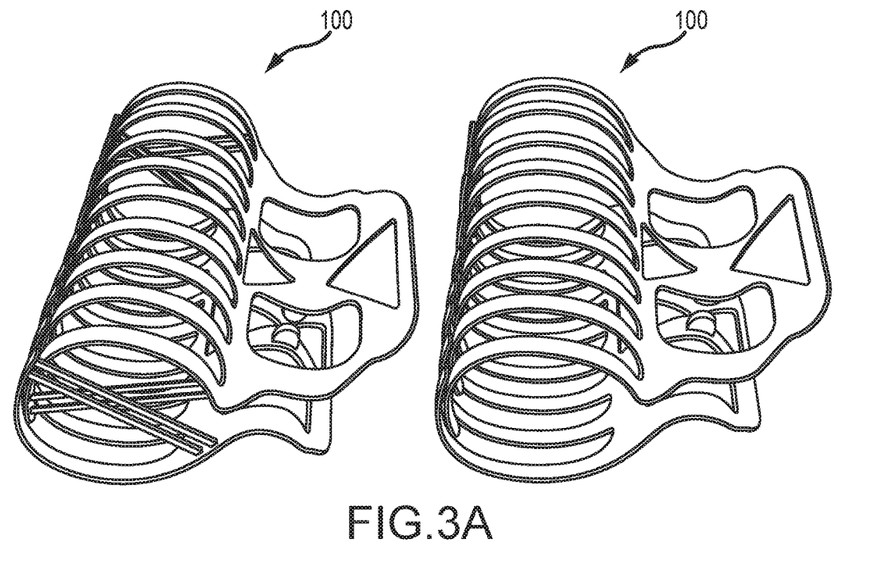
FIG. 3A shows two assembled devices side-by-side prior to nesting in an embodiment of the touchless disposable pet feces device of the present invention.
Figure 3B:
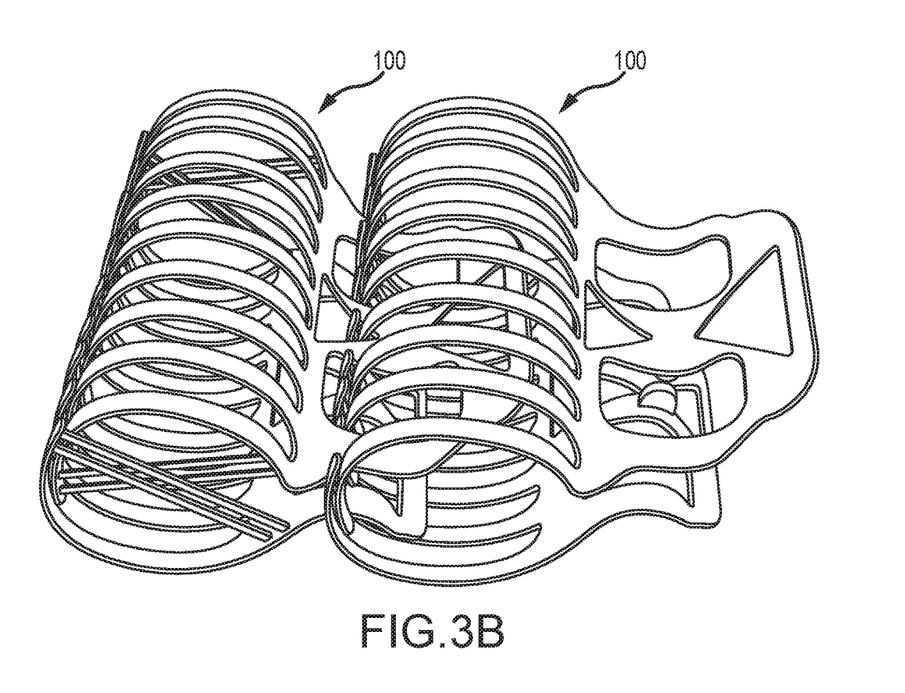
FIG. 3B shows two assembled devices nested together in an embodiment of the touchless disposable pet feces device of the present invention.

The handle portions 12A/12B of the two halves 2/4 have a void pattern to minimize the amount of material needed to form the device 100. This helps reduce the cost of manufacture. The voids 30 are also designed to allow the devices 100 to be overlapping and clip onto one another in a nesting fashion. The packaging to ship and sell the devices 100 can thus be smaller since the nested devices take up less space, which also reduces costs. FIG. 3A shows two devices 100 side by side before they are overlapped and nested together. FIG. 3B shows the two devices 100 overlapped and nested together. The curved tines 6A/6B of the device 100 on the right fit through the voids 30 in the two handle portions 12A/12B of the device 100 on the left, with the two handle portions 12A/12B of the device 100 on the left nested inside the enclosed volume of the curved tines 6A/6B of the device 100 on the right. A next device 100 can be attached to the second device 100 on the right, forming a three-device 100 nested group. Additional devices 100 can be attached further to the right up to the desired number of devices 100 for a particular package. For example, the devices 100 may be sold in packs of two, three, four, five, six, etc. up to an upper limit that may be based upon considerations of shipping costs and packaging costs.

FIGS. 4A through 4D show a method of using the touchless disposable pet feces device of the present invention. The method begins in FIG. 4A where the user squeezes the handle portions 12A/12B together which opens up the device 100 and positions the opening over the feces 14. In FIG. 4B the user begins to loosen the grip on the handles which begins to close the curved tines 6A/6B around the feces 14. In FIG. 4C the user has fully loosened the grip on the handle portions 12A/12B which closes the curved tines 6A/6B around the feces 14, capturing the feces 14 in the enclosed volume. In FIG. 4D, the user has lifted the device 100 off of the ground and can dispose of the device 100 and the feces 14 in the nearest waste container.

Figure 5A:
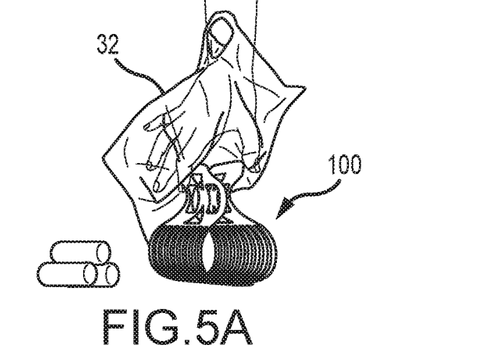
FIGS. 5A through 5F show an alternate method of using the touchless disposable pet feces device of the present invention.
Figure 5B:
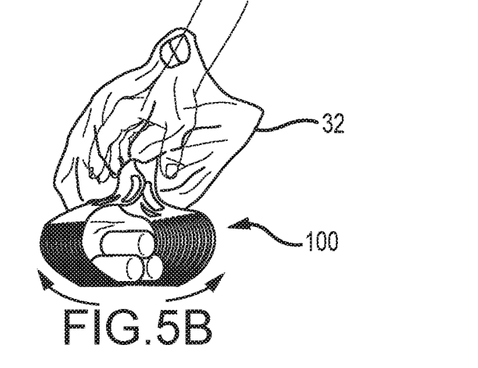
Figure 5C:
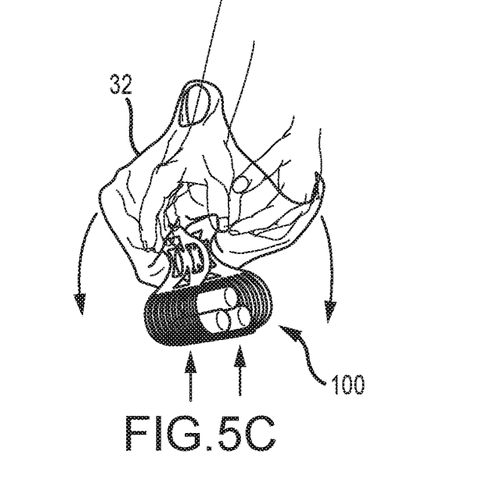
Figure 5D:
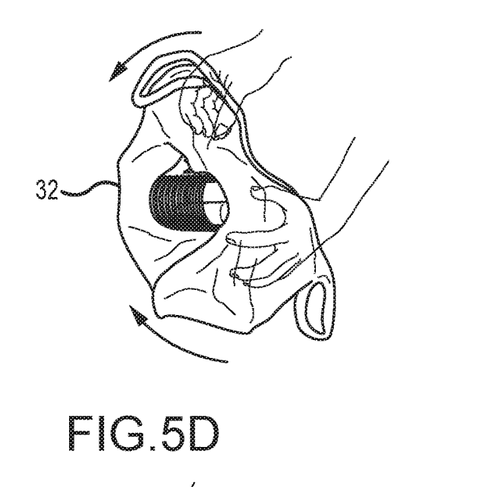
Figure 5E:
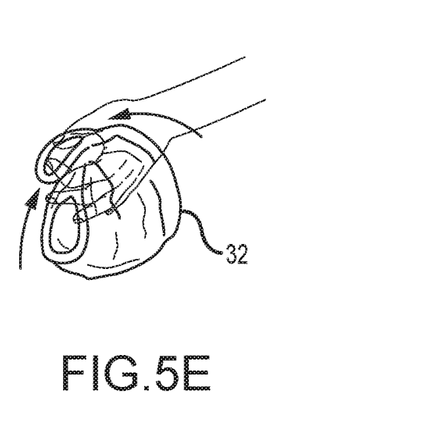
Figure 5F:
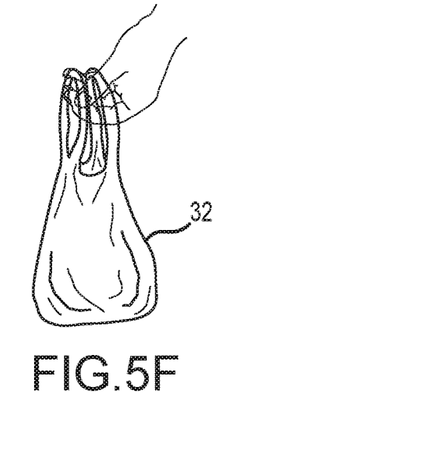

FIGS. 5A through 5F show an alternate method of using the touchless disposable pet feces device of the present invention. The method begins in FIG. 5A where the user has placed a first hand inside of a bag 32 and then grasps the handle portions 12A/12B of the device 100 with the fingers of the first hand that is inside of the bag 32. In FIG. 5B the user squeezes the handle portions 12A/12B together which opens up the device 100 and positions the opening over the feces 14. In FIG. 5C the user has fully loosened the grip on the handle portions 12A/12B which closes the device 100 around the feces 14, capturing the feces 14 in the enclosed volume. The user has also inserted a second hand inside the bag 32. In FIG. 5D, the user has lifted the device 100 off of the ground and begins to slide the bag with the second hand down towards the first hand and the device 100. In FIG. 5E, the user with the second hand gathers up the open edges of the bag 32 together. In FIG. 5F, the user has removed the first hand and holds the bag with the second hand. The device 100 is contained within the bag 32 and the user can dispose of the bag 32 with the device 100 and the feces 14 inside in the nearest waste container. This approach would likely be preferred when the user knows that no waste containers will likely be nearby, such as when walking a dog in a park or nature trail, or on residential neighborhood streets.

Figure 6A:
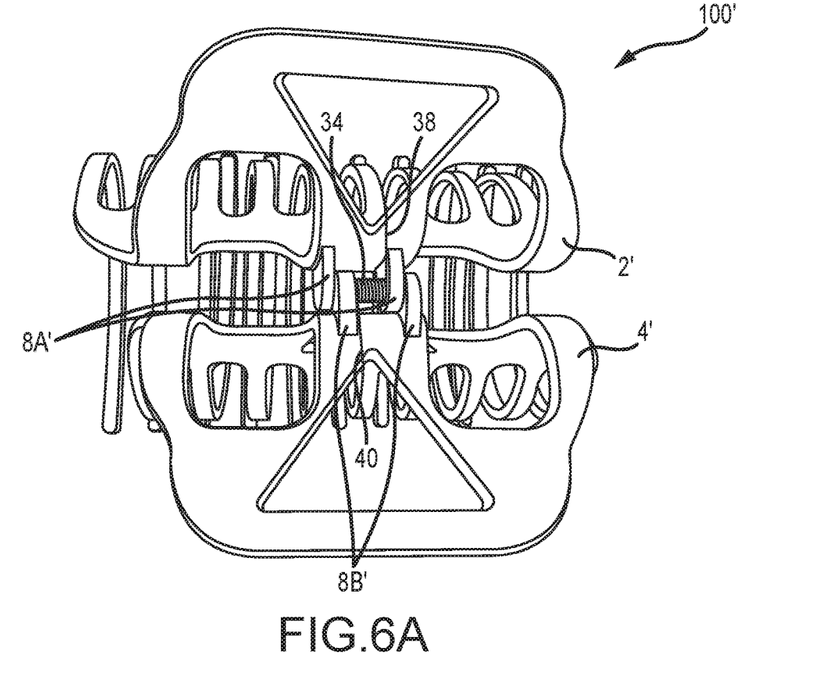
FIGS. 6A and 6B show another embodiment of the touchless disposable pet feces device of the present invention.
Figure 6B:
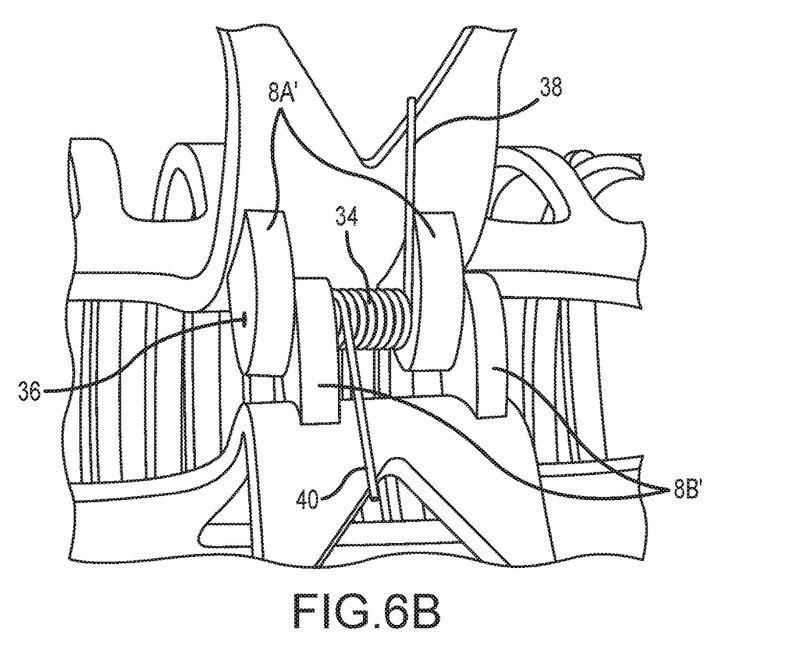

FIGS. 6A and 6B show another embodiment of the touchless disposable pet feces device of the present invention. Referring now to FIG. 6A, a top view of the device 100' is shown with a levered spring 34 located in a different position compared to device 100. Instead of being internal within the enclosed volume, the levered spring 34 is located just above the enclosed volume and below the handle portions 12A'/12B'. FIG. 6B shows an enlarged view of the levered spring 34 and the mounting features. The female half 2' and the male half 4' have hinge portion tabs 8A'/8B' that mate with each other and have a space between them. A small rod 36 passes through the hinge portion tabs 8A'/8B'. The levered spring 34 is placed into the space and the rod 36 passes through the center of the levered spring 34. The levered spring 34 has a first arm 38 and second arm 40, each arm 38/40 resting against one of the handle portions 12A'/12B'. The rod 36 within the hinge portion tabs 8A'/8B' allows for rotation about rod 36. Squeezing the handle portions 12A'/12B' together against the force of the levered spring 34 opens up the curved tines 6A/6B. By releasing pressure on the handle portions 12A'/12B' the force of the levered spring 34 will cause the curved tines 6A/6B to close. The method of using this embodiment of the invention is the same as described above in FIGS. 4A through 4D and FIGS. 5A through 5F.

Figure 7:
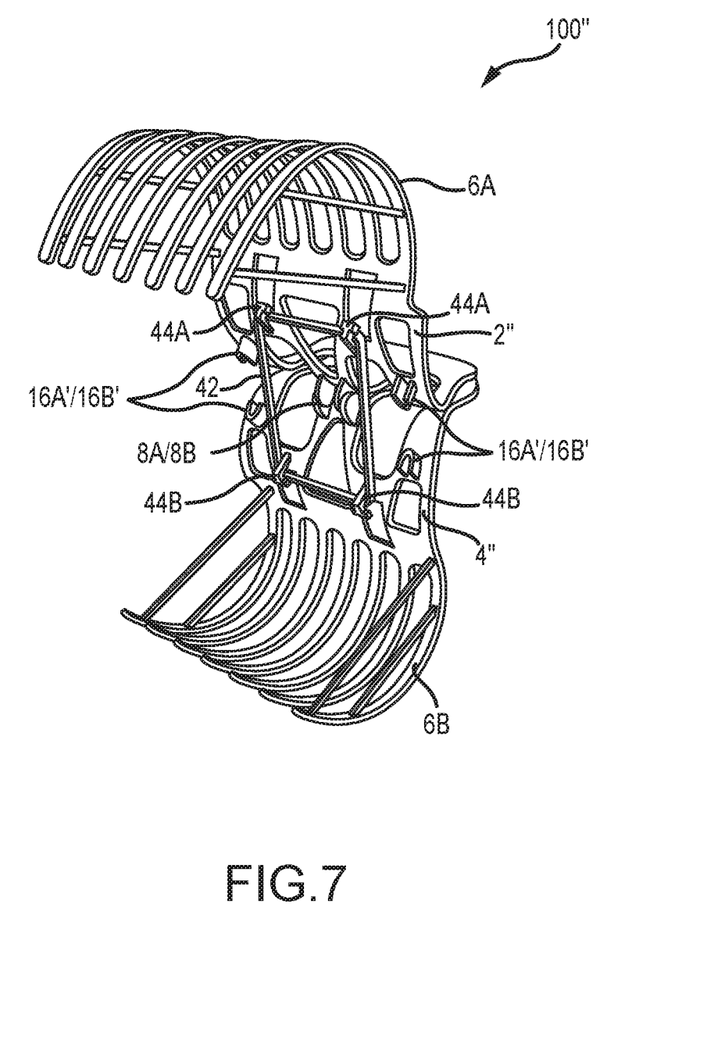
FIG. 7 shows another embodiment of the touchless disposable pet feces device of the present invention.

FIG. 7 shows another embodiment of the touchless disposable pet feces device of the present invention. Referring now to FIG. 7, a perspective view of the device 100" in an open position is shown that uses a rubber band 42 instead of spring 10 or levered spring 34 of devices 100/100'. The rubber band 42 is located internally just above the enclosed volume and below the handle portions 12A"/12B". The female half 2" and the male half 4" have hinge portion tabs 8A/8B like that shown in FIGS. 1A-1I that mate with each other. Female half 2" has two L-prongs 44A and male half 4" also has two L-prongs 44B located on a lower portion of the handle portions 12A"/12B". The rubber band 42 is positioned around each of the L-prongs 44A/44B. Stops 16A'/16B' are located in a slightly different position than those shown in device 100 but serve the same purpose. Squeezing the handle portions 12A"/12B" together against the force of the rubber band 42 opens up the curved tines 6A/6B. By releasing pressure on the handle portions 12A"/12B" the force of the rubber band 42 will cause the curved tines 6A/6B to close. The method of using this embodiment of the invention is the same as described above in FIGS. 4A through 4D and FIGS. 5A through 5F.

Figure 8:
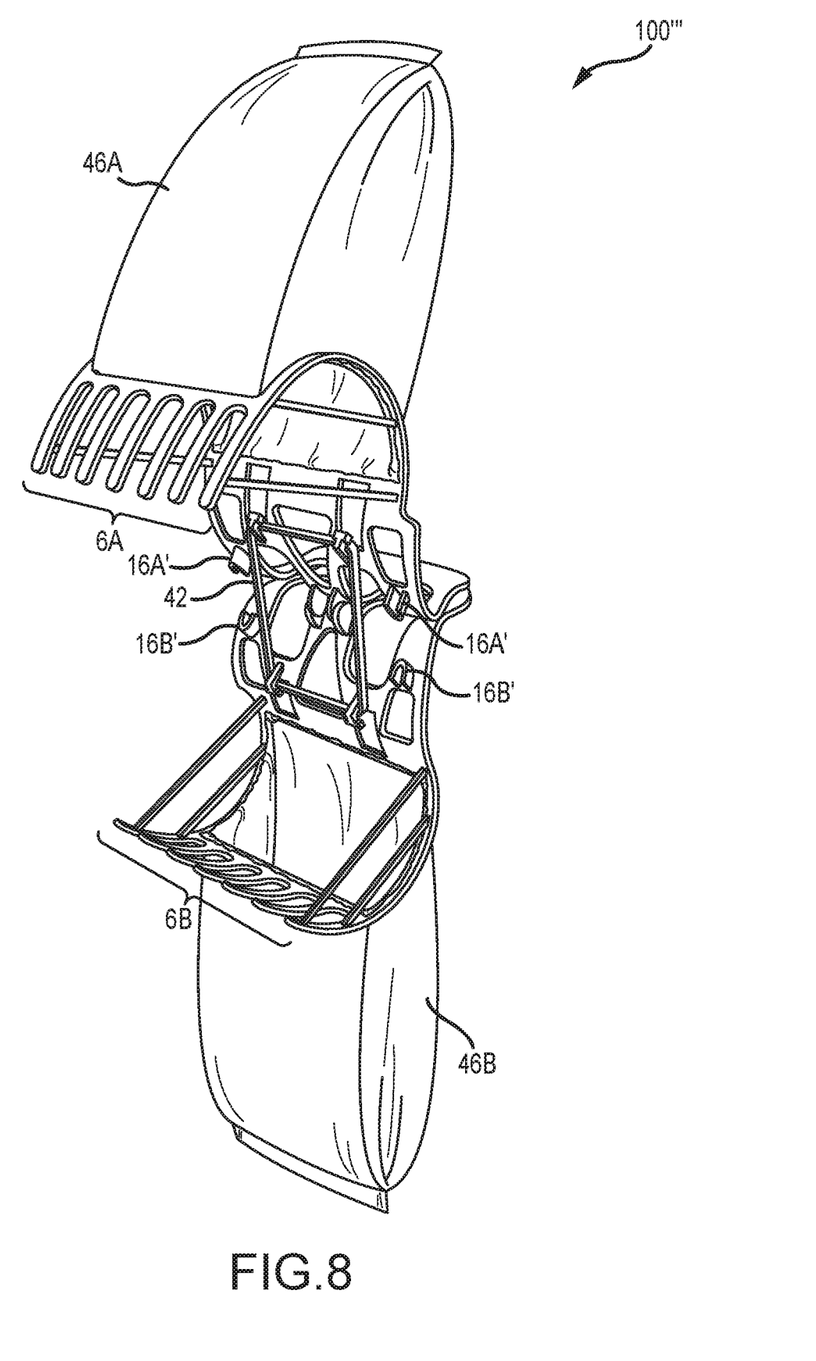
FIG. 8 shows another embodiment of the touchless disposable pet feces device of the present invention.

FIG. 8 shows another embodiment of the touchless disposable pet feces device of the present invention. Referring now to FIG. 8, a perspective view of the device 100''' in an open position is shown. In this embodiment, a portion of the curved tines 6A/6B on the outermost side have been removed, creating an opening through the curved tines 6A/6B. Bags 46A/46B each have an opening that is mated to the opening in the curved tines 6A/6B. The opening of bags 46A/46B are sealed to the opening in curved tines 6A/6B. This is accomplished with a hot glue gun or an adhesive that adheres the bags 46A/46B to the curved tines 6A/6B. The volume created by each of the bags 46A/46B is comparable to the volume contained between the curved tines 6A/6B. Feces 14 are picked up as described above, and device 100''' can be tilted or shaken side-to-side to cause the feces 14 to fall into the bags 46A/46B. Bag 46A can be filled with feces 14, then bag 46B can be filled with feces 14, and finally the open volume within device 100''' can be filled with feces 14. Thus, nearly three times as much feces 14 can be collected with one device 100''' as compared to devices 100/100'/100".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A touchless disposable pet feces device comprising:
   a first half comprising:
      a first handle portion at a first end;
      a first plurality of curved tines at a second end;
      a first hinge portion pair of tabs positioned between the first end and the second end, each of the tabs having a hole there through;
   a second half comprising:
      a second handle portion at a third end;
      a second plurality of curved tines at a fourth end;
      a second hinge portion pair of tabs positioned between the third end and the fourth end, each of the tabs having a nub, wherein the nubs in the second hinge portion pair of tabs mate with the holes in the first hinge portion pair of tabs;
   a spring attached at a first end to the first half between the first handle portion and the first plurality of curved tines, and attached at a second end to the second half between the second handle portion and the second plurality of curved tines;
   at least one first side bar located on a first outer end of the first plurality of curved tines and at least one second side bar located on a second outer end of the first plurality of curved tines; and
   at least one third side bar located on a first outer end of the second plurality of curved tines and at least one fourth side bar located on a second outer end of the second plurality of curved tines;
   whereby squeezing the first and second handle portions together tensions the spring and rotates the first and second plurality of curved tines apart, and releasing the first and second handle portions enables the spring to close the first and second plurality of curved tines around a pet feces and trap the pet feces in an enclosed volume between the first and second plurality of curved tines, and the at least one first side bar and the at least one third side bar, and the at least one second side bar and the at least one fourth side bar, provide a crisscross barrier to prevent the pet feces from falling out of the enclosed volume.

2. The touchless disposable pet feces device according to claim 1 further comprising:
   at least one first stop on the first half located between the first hinge portion pair of tabs and the first plurality of curved tines; and
   at least one second stop on the second half located between the second hinge portion pair of tabs and the second plurality of curved tines;
   whereby when the touchless disposable pet feces device is in a closed position the at least one first stop and the at least one second stop abut one another and prevent the first and second plurality of curved tines from closing completely against each other, preserving the enclosed volume, and allowing the plurality of ends of the first and second plurality of curved tines to overlap with each other a short distance.

3. The touchless disposable pet feces device according to claim 1 further comprising:
   a first middle curved tine of the first plurality of curved tines;
   a first pair of nibs located on either side of the first middle curved tine;
   a second middle curved tine of the second plurality of curved tines;
   a second pair of nibs located on either side of the second middle curved tine;
   a first looped end of the spring positioned between the first pair of nibs on the first middle curved tine and the first handle portion; and
   a second looped end of the spring positioned between the second pair of nibs on the second middle curved tine and the second handle portion;
   whereby the spring is kept in a proper position to effectuate opening and closing of the first and second halves of the touchless disposable pet feces device.

4. The touchless disposable pet feces device according to claim 1 further comprising:
   a plurality of voids in the first and second handle portions;
   whereby minimizing an amount of material to form the touchless disposable pet feces device, and enabling nesting of two or more touchless disposable pet feces devices for packaging purposes.

5. A touchless disposable pet feces device comprising:
   a first half comprising:
      a first handle portion at a first end;
      a first plurality of curved tines at a second end;
      a first hinge portion pair of tabs positioned between the first end and an upper portion of the first plurality of curved tines, each of the tabs having a hole there through;
   a second half comprising:
      a second handle portion at a third end;
      a second plurality of curved tines at a fourth end;
      a second hinge portion pair of tabs positioned between the third end and an upper portion of the second plurality of curved tines, each of the tabs having a hole there through, whereby the first hinge portion pair of tabs are mated with the second hinge portion pair of tabs such that all the holes in the tabs align with each other;
   a rod positioned within all of the holes in the first hinge portion pair of tabs and the second hinge portion pair of tabs;

a levered spring positioned around the rod and between the first hinge portion pair of tabs and the second hinge portion pair of tabs, the levered spring having a first arm that rests against the first handle portion, and a second arm that rests against the second handle portion;

at least one first side bar located on a first outer end of the first plurality of curved tines and at least one second side bar located on a second outer end of the first plurality of curved tines; and at least one third side bar located on a first outer end of the second plurality of curved tines and at least one fourth side bar located on a second outer end of the second plurality of curved tines;

whereby the levered spring is kept in a proper position to effectuate opening and closing of the first and second halves and squeezing the first and second handle portions together tensions the levered spring and rotates the first and second plurality of curved tines apart, and releasing the first and second handle portions enables the levered spring to close the first and second plurality of curved tines around a pet feces and trap the pet feces in an enclosed volume between the first and second plurality of curved tines, and the at least one first side bar and the at least one third side bar, and the at least one second side bar and the at least one fourth side bar, provide a crisscross barrier to prevent the pet feces from falling out of the enclosed volume.

6. The touchless disposable pet feces device according to claim 5 further comprising:

at least one first stop on the first half located between the first hinge portion pair of tabs and the first plurality of curved tines; and at least one second stop on the second half located between the second hinge portion pair of tabs and the second plurality of curved tines;

whereby when the touchless disposable pet feces device is in a closed position the at least one first stop and the at least one second stop abut one another and prevent the first and second plurality of curved tines from closing completely against each other, preserving the enclosed volume, and allowing the plurality of ends of the first and second plurality of curved tines to overlap with each other a short distance.

7. The touchless disposable pet feces device according to claim 5 further comprising:

a plurality of voids in the first and second handle portions;

whereby minimizing an amount of material to form the touchless disposable pet feces device, and enabling nesting of two or more touchless disposable pet feces devices for packaging purposes.

8. A touchless disposable pet feces device comprising:

a first half comprising:
a first handle portion at a first end;
a first plurality of curved tines at a second end;
a first pair of L-prongs located on a lower portion of the first handle portion;
a first hinge portion pair of tabs positioned between the first end and the second end, each of the tabs having a hole there through;

a second half comprising:
a second handle portion at a third end;
a second plurality of curved tines at a fourth end;
a second pair of L-prongs located on a lower portion of the second handle portion;
a second hinge portion pair of tabs positioned between the third end and the fourth end, each of the tabs having a nub, wherein the nubs in the second hinge portion pair of tabs mate with the holes in the first hinge portion pair of tabs;

a rubber band positioned around the first pair of L-prongs and the second pair of L-prongs;

at least one first side bar located on a first outer end of the first plurality of curved tines and at least one second side bar located on a second outer end of the first plurality of curved tines; and at least one third side bar located on a first outer end of the second plurality of curved tines and at least one fourth side bar located on a second outer end of the second plurality of curved tines;

whereby squeezing the first and second handle portions together tensions the rubber band and rotates the first and second plurality of curved tines apart, and releasing the first and second handle portions enables the rubber band to close the first and second plurality of curved tines around a pet feces and trap the pet feces in an enclosed volume between the first and second plurality of curved tines, and the at least one first side bar and the at least one third side bar, and the at least one second side bar and the at least one fourth side bar provide a crisscross barrier to prevent the pet feces from falling out of the enclosed volume.

9. The touchless disposable pet feces device according to claim 8 further comprising:

at least one first stop on the first half located between the first hinge portion pair of tabs and the first plurality of curved tines; and at least one second stop on the second half located between the second hinge portion pair of tabs and the second plurality of curved tines;

whereby when the touchless disposable pet feces device is in a closed position the at least one first stop and the at least one second stop abut one another and prevent the first and second plurality of curved tines from closing completely against each other, preserving the enclosed volume, and allowing the plurality of ends of the first and second plurality of curved tines to overlap with each other a short distance.

10. The touchless disposable pet feces device according to claim 8 further comprising:

a plurality of voids in the first and second handle portions;

whereby minimizing an amount of material to form the touchless disposable pet feces device, and enabling nesting of two or more touchless disposable pet feces devices for packaging purposes.

11. The touchless disposable pet feces device according to claim 8 further comprising:

a first opening through the first plurality of curved tines;

a second opening through the second plurality of curved tines;

a first bag having a first bag opening that is mated and sealed to the first opening through the first plurality of curved tines and a closed end that extends away from the first plurality of curved tines; and a second bag having a second bag opening that is mated and sealed to the second opening through the second plurality of curved tines and a closed end that extends away from the second plurality of curved tines;

whereby the pet feces trapped in the enclosed volume can be shaken side-to-side to cause the pet feces to fall into the first bag or the second bag thereby increasing an amount of the pet feces that can be trapped within the touchless disposable pet feces device.

* * * * *